Patented Aug. 14, 1945

2,382,622

UNITED STATES PATENT OFFICE 2,382,622

GLYCOL ESTERS OF PHENYLPHOSPHONIC ACID

Arthur Dock Fon Toy, Chicago, Ill., assignor to Victor Chemical Works, a corporation of Illinois No Drawing. Application January 3, 1944, Serial No. 516,845

10 Claims. (Cl. 260—461)

This invention relates to the production of phenyl phosphonic acid esters of ethylene and trimethylene glycols and alkyl substituted ethylene and trimethylene glycols, and more particularly to the production of such esters by the reaction of phenyl phosphorus oxydichloride with ethylene and trimethylene glycols and their alkyl substituted products.

In accordance with the present discovery it has been found that ethylene glycol and trimethylene glycol will react with phenyl phosphorus oxydichloride to produce ring type esters of the following type formula:

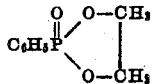

and

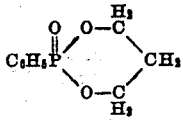

Glycols in which there are more than three carbon atoms in a straight chain between the hydroxy groups do not react to give definite esters but only resinous compositions. Side chain groups, however, may be substituted without interfering with the ester reaction. For example 2,3-butanediol will react to give esters of the type herein described. The type of glycol employed in the present invention may be designated by the formula HO(CHY)$_x$OH, where $x$ is 2 or 3 and Y is hydrogen or a side chain alkyl group.

The reaction of the glycols with phenyl phosphorus oxydichloride is quite vigorous and requires that the temperature be controlled during the early stages at a temperature low enough to avoid decomposition while in the presence of high concentrations of hydrogen chloride. The general equation for the reaction is as follows:

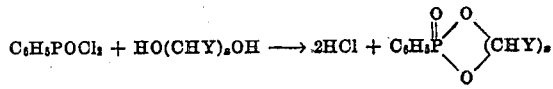

where $x$ is limited to 2 or 3, and Y is hydrogen or an alkyl group.

As a typical example of the process, 58.5 parts of phenyl phosphorus oxydichloride and 19.5 parts (by weight) of ethylene glycol were mixed in a reaction vessel under vacuum while maintaining a temperature of not over about 25° C. After approximately 85 to 95% of the hydrogen chloride is removed, the heat is raised to distill off the excess ethylene glycol. The remaining product which is the phenyl-phosphonate of ethylene glycol is then purified by distillation or other suitable means. By distillation a yield of approximately 75% of the ester product was obtained. This ester has a boiling point of approximately 210° C. at 6-7 mm. pressure and when cooled forms a hygroscopic, white, crystalline solid.

In a similar manner, trimethylene glycol and phenyl phosphorus oxydichloride were reacted to produce the phenylphosphonate of trimethylene glycol which is a slightly colored oily product having a boiling point of 212-214° C. at 7.5 mm. pressure. The ester product was obtained in a yield of approximately 67%.

In another example, 28.4 grams (0.315 mole) levo 2,3-butanediol $$\begin{pmatrix} \text{HOCH—CHOH} \\ \text{CH}_3 \ \text{CH}_3 \end{pmatrix}$$

was reacted with 58.5 grams (0.3 mole) phenyl phosphorus oxydichloride at a temperature of about 10° C. under a vacuum ranging from 100 mm. down to 20 mm. pressure for about 16 hours until most of the hydrogen chloride formed had been eliminated. The temperature was then gradually raised to drive off all of the hydrogen chloride and finally to distill over the phenylphosphonate of dimethylethylene glycol as a clear oily, water-insoluble liquid having a boiling point of 210–215° C. at 15 mm. pressure. The yield was 78.6%.

The above type ester compounds are suitable for use as plasticizing and oil addition agents.

The foregoing detailed description has been given for clearness of understanding only, and no unnecessary limitations should be understood therefrom.

What I claim as new, and desire to secure by Letters Patent, is:

1. An ester compound of the general formula

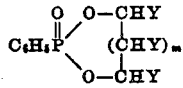

where Y is a group of the class consisting of hydrogen and alkyl groups, and $m$ is one or zero.

2. An ester compound of the general formula

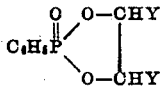

where Y is a group of the class consisting of hydrogen and alkyl groups.

3. The process which comprises mixing phenyl phosphorus oxydichloride with a glycol of the formula HO—(CHY)$_n$—OH, where Y is a group of the class consisting of hydrogen and alkyl groups and $n$ is 2 or 3, and reacting the mixture under vacuum at less than about 30° C. until most of the hydrogen chloride formed is eliminated, then heating to drive off the remaining hydrogen chloride and excess glycol, and finally purifying the ester compound.

4. The process which comprises mixing phenyl phosphorus oxydichloride with ethylene glycol, maintaining a temperature not over 25° C., removing substantially all of the hydrogen chloride formed under a vacuum, and then heating to remove residual ethylene glycol and any residual hydrogen chloride.

5. The process which comprises mixing phenyl phosphorus oxydichloride with trimethylene glycol, maintaining a temperature not over 25° C., removing substantially all of the hydrogen chloride formed under a vacuum, and then heating to remove residual trimethylene glycol and any residual hydrogen chloride.

6. The process which comprises mixing phenyl phosphorus oxydichloride with 2,3 butanediol, maintaining a temperature not over 25° C., removing substantially all of the hydrogen chloride formed under a vacuum, and then heating to remove residual butanediol and any residual hydrogen chloride.

7. The phenylphosphonate of ethylene glycol having the general formula

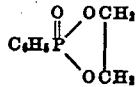

and a boiling point of approximately 210° C. at 6-7 mm. pressure.

8. The phenyl phosphonate of dimethylethylene glycol having the general formula

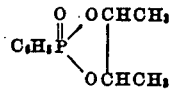

and a boiling point of 210-215° C. at 15 mm. pressure.

9. The phenylphosphonate of trimethylene glycol having the general formula

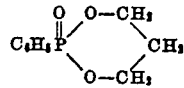

and a boiling point of 212-214° C. at 7.5 mm. pressure.

10. The process which comprises mixing phenyl phosphorus oxydichloride with a glycol of the formula HO—(CHY)$_n$—OH, where Y is a group of the class consisting of hydrogen and alkyl groups and $n$ is 2 or 3, and reacting the mixture under vacuum at less than about 30° C. until most of the hydrogen chloride formed is eliminated, then heating to drive off the remaining hydrogen chloride and excess glycol, and finally distilling the ester compound from the residual material under vacuum.

ARTHUR DOCK FON TOY.